Patented Nov. 19, 1935

2,021,663

UNITED STATES PATENT OFFICE 2,021,663

METHOD OF PRODUCING LIME

William H. Knox, Jr., Nashville, Tenn., assignor to Victor Chemical Works, Chicago Heights, Ill., a corporation of Illinois No Drawing. Application September 25, 1933, Serial No. 690,953

4 Claims. (Cl. 222—4)

This invention relates to an improved lime and a method of preparing the same.

Lime has heretofore generally been produced by the calcining of limestone. This process has been carried out by heating the limestone at temperatures of the order of 900° C. until the carbon dioxide has been substantially removed therefrom. The practice was always to stop the heating as soon as the carbon dioxide had been removed, or even somewhat before, since further heating served no known useful purpose, and because overheating often produced a dead burnt lime.

It has now been discovered that a lime having a greater stability against air-slaking, and at the same time having an improved chemical reactivity to liquid phase reagents may be prepared by continuing the heating of the lime at a temperature of 1000° to 1500° C. for a period of ½ to 12 hours beyond the normal calcining treatment. Such treatment not only produces a lime having improved chemical properties but at the same time will reduce the fluorine content thereof to 5 parts per million or less, and in fact, will completely remove the fluorine.

The advantage of the stability of the lime in air is, of course, obvious. The improved chemical reactivity is of primary advantage in such reactions as ordinary slaking or in the production of monocalcium phosphate and the like. In carrying out such reactions the product, instead of immediately slaking to a powder, first swells, and then disintegrates into small lumps which react vigorously with the water or phosphoric acid. In the production of monocalcium phosphate this is particularly advantageous in that it precludes the possibility of forming a phosphate protective layer over unreacted lime particles, and minimizes the loss of lime as dust in chemical reactions. The production of a fluorine free lime is of considerable importance, particularly where the lime ultimately goes into food products—for example, monocalcium phosphate in baking powder. Normal lime as used for the production of monocalcium phosphate has a fluorine content of the order of 20 to 300 parts per million and generally from 50 to 75 P. P. M.

In accordance with the present invention limestone, preferably a high calcium limestone of high purity, is calcined at 900 to 1200° C. until the carbon dioxide is removed, and the heating is then continued for a period of ½ to 12 hours depending upon the temperature thereafter employed. For example, with a temperature of 1400° C. the final heating period was only ½ hour. At 1200° C. a precalcined lime containing 47 parts per million of fluorine showed a reduction to 7 P. P. M. in one hour and no fluorine in two hours.

A typical analysis of a lime suitable for further heating by this process is as follows:

| | | |
|---|---|---|
| CaO | percent | 98.0 |
| Acid insol | do | 0.45 |
| Fe and Al$_2$O$_3$ | do | 0.20 |
| SO$_3$ | do | 0.03 |
| MgO | do | 0.30 |
| Loss on ign | do | 0.90 |
| Pb | P. P. M | 0.5 |
| As$_2$O$_3$ | do | 0.6 |
| F | do | 75.0 |

Such a lime when heated for two hours at 1350° C. produced a fluorine free product which was remarkably stable toward air-slaking, and at the same time was chemically reactive to liquid reagents in an improved degree.

It is preferred to use the more porous or semi-oölitic limestones.

It is preferred that the lime or limestone treated by this method be in lumps of uniform size. A satisfactory lump size for the time of heating here disclosed is 1 inch. However, the size may be varied widely, the longer the heating period, the larger being the size. The flowing of air or other inert gas through the heated lime charge facilitates the fluorine removal.

By air-stable as used herein is meant that the lime slakes very slowly in air.

In general the new product requires at least twice as much time to air-slake as regular soft-burned lime. For example, a sample of the above product required 72 hours to reach the same degree of disintegration reached by a small lump of regular soft-burned lime in 24 hours. An additional exposure of 24 hours in each case reduced the lumps to powder.

The reactions leading to the removal of the fluorine are not known. Presumably the fluorine is present as fluoride, and it is believed that the fluoride reacts with silica present in the lime to form silicon tetrafluoride which passes off as a gas. It is also believed that the silica is what causes dead burning at the higher temperatures and it is therefore believed that the production of the silicon tetrafluoride prevents the dead burning at the high temperatures used, and it is therefore preferred to continue the heating only so long as fluorine is present. It is also therefore preferred to have a low silica lime or limestone.

The foregoing detailed description has been given for clearness of understanding only, and no unnecessary limitations should be understood therefrom, but the appended claims should be construed as broadly as permissible, in view of the prior art.

What I claim as new, and desire to secure by Letters Patent, is:

1. The method of treating limestone containing fluorine in the order of 20-300 parts fluorine per million parts CaO which comprises heating said limestone to remove substantially all of the carbon dioxide therefrom, and then continuing the heating of the product at a temperature of 1000° to 1500° C. for a period of the order of 1 to 12 hours, said lower temperature corresponding to said longer period, and vice versa, whereby a lime having a fluorine content below 5 parts per million is produced.

2. The method of producing a substantially fluorine free lime from lime containing fluorine in the order of 20 to 300 P. P. M. which comprises heating said lime at a temperature of 1000° to 1500° C. for a period sufficient to reduce the fluorine content to a point below 5 P. P. M.

3. The method as set forth in claim 2 in which said lime contains fluorine of the order of 75 P. P. M. and said heating is carried out at 1200° to 1400° C. for 2 to 4 hours.

4. The method as set forth in claim 2 in which said fluorine content is of the order of 47 P. P. M. and said lime is heated at 1200° C. for a period of the order of 2 hours.

WILLIAM H. KNOX, JR.